United States Patent [19]

Bauer

[11] 4,415,357
[45] Nov. 15, 1983

[54] SOLID WASTE TREATMENT IN REDUCTION OF IRON ORE

[75] Inventor: William V. Bauer, New York, N.Y.

[73] Assignee: The Lummus Company, Bloomfield, N.J.

[21] Appl. No.: 387,800

[22] Filed: Jun. 14, 1982

[51] Int. Cl.³ ............................................. C21B 13/08
[52] U.S. Cl. .......................................... 75/29; 75/24; 75/36
[58] Field of Search ................................. 75/24, 36, 29

[56] References Cited

U.S. PATENT DOCUMENTS 3,758,292  9/1973  Kuntz et al. .............................. 75/24
3,856,495  12/1974  Foxton ...................................... 75/24

Primary Examiner—M. J. Andrews
Attorney, Agent, or Firm—Elliot M. Olstein; Louis E. Marn

[57] ABSTRACT

In the direct reduction of iron ore wherein a solid mixture of unused carbonaceous reductant and spent flux is roasted to convert calcium sulfide to sulfate, the solids recovered from the roasting are carbonated to further reduce the sulfide content, and convert calcium oxide to the carbonate to provide a stabilized solid waste for disposal.

12 Claims, 1 Drawing Figure

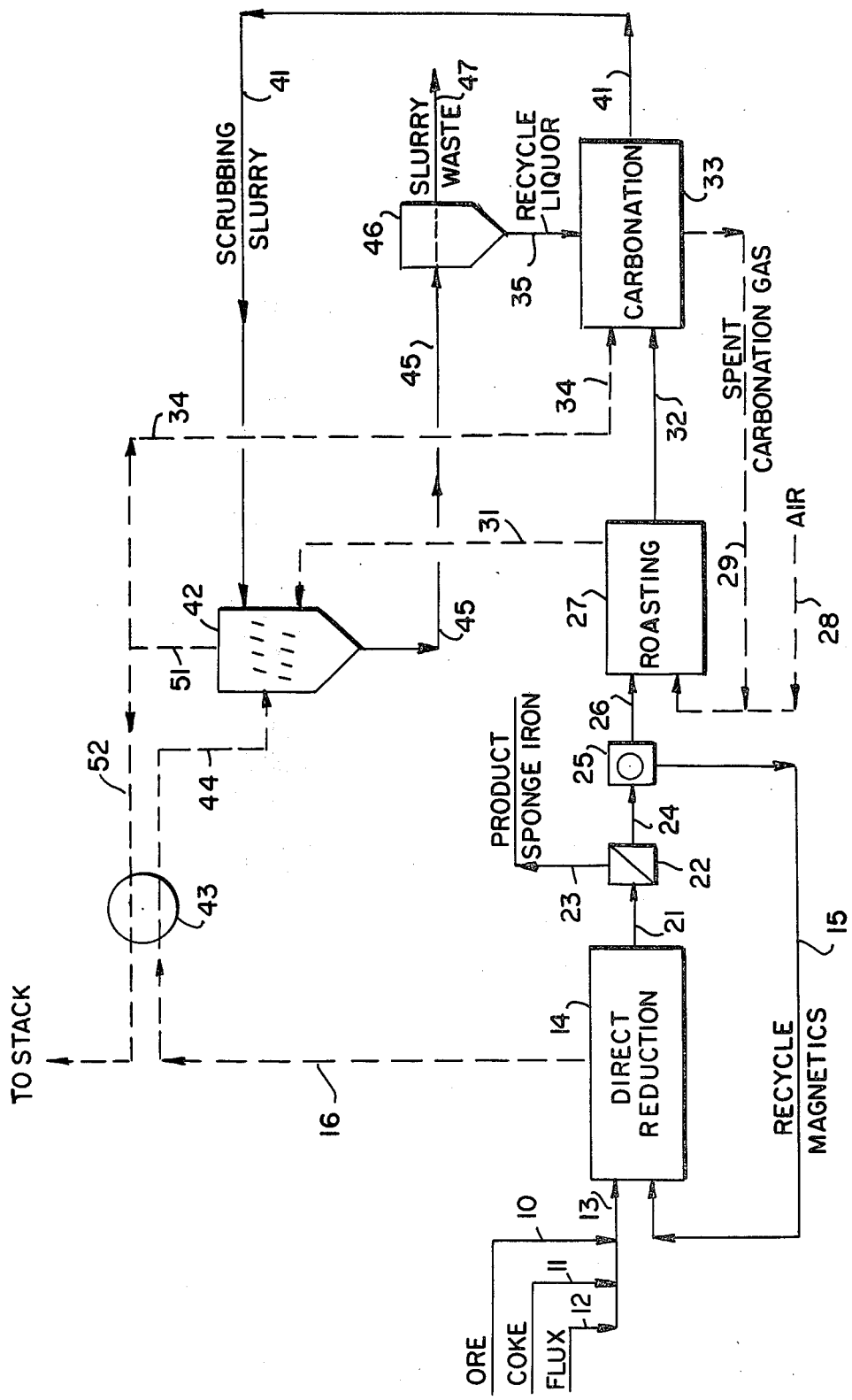

SOLID WASTE TREATMENT IN REDUCTION OF IRON ORE

This invention relates to the reduction of iron ore, and more particularly to the treatment of iron free solids recovered from such reduction.

Direct reduction of iron ore to produce "sponge iron" is an important and growing method of producing iron suitable for conversion to steel.

On such methodology for direct reduction of iron ore involves the use of a reduction kiln into which there is introduced iron ore (lump or pelletized), a solid carbonaceous reductant and flux for binding with the sulfur in the kiln (generally as part of the carbonaceous reductant) to thereby prevent such sulfur from combining with the metallized iron. In general, such flux includes calcium carbonate, generally in the form of limestone or dolomite.

In the reduction kiln, the feed is heated to reaction temperature and retained for a number of hours to achieve the desired reduction of the iron oxide in the ore to sponge iron. During the heating, the flux evolves carbon dioxide, and is converted to oxides, with the calcium oxide subsequently reacting with the sulfur values ($H_2S$, COS) generated during reduction from the sulfur contained in the carbon source to form calcium sulfide. To achieve good reduction, a large amount of carbonaceous reductant is fed to the kiln, generally about three times the amount actually consumed, so that even at the discharge end of the kiln there is sufficient carbon to cover the kiln burden and prevent reoxidation of the iron sponge.

The kiln discharge is comprised of iron sponge product, excess carbonaceous reductant, generally as char, and spent flux, which includes calcium oxide and calcium sulfide.

In some direct reduction processes, after recovery of iron values, the solid mixture, which contains the carbonaceous reductant and spent flux is combusted in a roasting operation (similar to fluidized bed coal combustion) to convert most of the sulfide in the spent flux to calcium sulfate. Such a roasting operation is used to generate by-product high pressure steam, and in some cases, electric power, and is justified where local energy costs are high relative to the value of the carbonaceous reductant. The resulting solid waste reacts with water slowly and generates high pH in the leachate. Accordingly, such material presents a waste disposal problem.

In accordance with the present invention, there is provided improved treatment of the solids recovered from the direct reduction of iron ore so as to enable effective disposal of the solid wastes.

More particularly, the solids recovered from the roasting operation are treated by carbonating such solids as an aqueous slurry to further reduce the sulfide content and to convert calcium oxide to the carbonate, and thereby produce a stabilized solid waste suitable for disposal.

In accordance with a preferred embodiment, such carbonating is achieved by use of gaseous carbon dioxide, with the gas recovered from such carbonation, which contains hydrogen sulfide, being employed in the roasting operation to convert hydrogen sulfide to sulfur dioxide which reacts with calcium oxide in the spent flux, whereby, in the roasting operation, such sulfur dioxide is removed from the gas as calcium sulfate.

The solids from the roasting may be carbonated by direct addition of carbon dioxide or by treatment with a solution of an alkali carbonate and/or bicarbonate, with such reactions being represented by the following equations, wherein M is an alkali metal:

$$CaO + CO_2 = CaCO_3 \tag{1}$$

$$MgO + CO_2 = MgCO_3 \tag{2}$$

$$CaO + M_2CO_3 + H_2O = CaCO_3 + 2\,MOH \tag{3}$$

$$MgO + M_2CO_3 + H_2O = MgCO_3 + 2\,MOH \tag{4}$$

$$CaO + MHCO_3 = CaCO_3 + MOH \tag{5}$$

$$MgO + MHCO_3 = MgCO_3 + MOH \tag{6}$$

In the above reactions, the reaction between magnesium oxide and alkali carbonate may proceed only to a limited extent.

Accordingly, the carbonation is best achieved by direct treatment with carbon dioxide containing gas.

The spent flux in the mixture is treated with carbon dioxide or carbonate at conditions at which the oxide of the flux can be converted to the corresponding carbonate. In general, the carbonation is accomplished at temperatures in the order of from room temperature up to the boiling temperature of the aqueous liquid at the prevailing pressure (generally atmospheric pressure).

Applicant has also found that in addition to achieving the desired conversion of oxides, calcium sulfide in the spent flux, is also carbonated to produce calcium carbonate and hydrogen sulfide. Such carbonation of the sulfide is best accomplished by direct treatment with carbon dioxide in that when using alkali metal carbonates or bicarbonates, alkali sulfide by-product is formed, which is soluble in water, and which may be troublesome from the point of view of subsequent processing.

In carbonating calcium sulfide to calcium carbonate and hydrogen sulfide, sometime during the carbonation the pH should be below 10, and preferably below 8.5. In addition, in order to achieve a higher concentration of hydrogen sulfide in the effluent gas from the carbonation, the amount of carbonation gas should be controlled to achieve an acceptable reaction rate (generally in excess of stoichiometric proportions), while simultaneously preventing excessive dilution of hydrogen sulfide in the effluent gas.

The gas recovered from such carbonation will include some hydrogen sulfide and such gas may be treated in a sulfur recovery operation to recover sulfur values as elemental sulfur, or may be recycled to the roasting operation, as hereinabove described.

In accordance with a further embodiment of the invention, an aqueous slurry of the carbonated solids may be employed for treating the off-gas from the iron reduction. A direct reduction operation generates appreciable levels of sulfur oxides, especially where a high sulfur reductant is employed. In order to meet requirements for release of oxides or sulfur into the atmosphere, in such cases, an aqueous slurry of the carbonated solids is employed for scrubbing the off-gas from the reduction operation.

More particularly, the aqueous slurry of carbonated flux, which includes calcium carbonate, is employed for direct contact with the off-gas from the direct reduction (a scrubbing operation) to remove sulfur oxide(s) from the gas. In such an operation, in the presence of oxygen, the sulfur values are recovered as calcium sulfate and carbon dioxide is released from the carbonate. The scrubbing operation may be operated at conditions generally employed in the art for removing sulfur dioxide from gases.

The off-gas from the scrubbing operation includes carbon dioxide, and all or a portion thereof may be employed to provide carbon dioxide requirements for carbonation of the solids from the roasting operation.

Similarly, the off-gas from the direction reduction of iron ore also includes carbon dioxide, and all or a portion of such gas may be employed to provide carbon dioxide requirements for carbonation of the solids from the roasting operation.

The invention will be further described with respect to the following drawings, wherein:

The drawing is a simplified schematic flow diagram of an embodiment of the present invention.

It is to be understood, however, that the scope of the invention is not to be limited to the embodiments illustrated in the drawing.

Referring now to the drawing, iron ore in line 10, carbonaceous reductant, in the form of coke, in line 11, and flux, which includes calcium carbonate, in line 12, are introduced through line 13 into a direct reduction zone, schematically generally indicated as 14, for directly reducing the iron ore to produce "sponge iron". The direct reduction zone 14 generally includes a suitable rotary kiln, and is operated at conditions known in the art for effecting direct reduction of iron ore to sponge iron. Thus, for example, the reduction may be accomplished at a temperature in the order of from 1600° F. to 2100° F.

In addition, the direct reduction zone 14 is provided with recycle magnetics in line 15, obtained as hereafter described.

In the direct reduction zone 14, the iron core is converted to sponge iron, and calcium oxide is partially converted to calcium sulfide.

An off-gas, which includes carbon dioxide released from the flux, is withdrawn from the direct reduction zone 14 through line 16 for treatment as hereinafter described.

A solid mixture, including sponge iron, spent flux, which is comprised of calcium oxide, as well as calcium sulfide (and which may further include magnesium oxide if the flux is provided as dolomite), the unused carbonaceous reductant, generally in the form of a char, is withdrawn from direct reduction zone 14 through line 21 for introduction into a suitable separation device, schematically generally indicated as 22 for separating sponge iron from the remainder of the solids. Thus, for example, separation zone 22 may be a screening operation in order to separate the large sponge iron particles from the unused carbonaceous reductant and spent flux. Such sponge iron product is recovered through line 23.

The undersized product mixture comprised of spent flux, unused carbonaceous reductant, as well as some iron material, is withdrawn from separator 22 through line 24 and introduced into a recovery zone 25 for recovering any remaining iron material in the mixture. The recovery zone 25 may be a magnetic separator of a type known in the art, with recycle magnetics being recovered through line 15 for recycle to the direct reduction.

A solid mixture, including spent flux, which includes calcium oxide and calcium sulfide, and in some cases, also magnesium oxide, with the mixture further including the unused carbonaceous reductant, generally in the form of char, is withdrawn from separation zone 26, and introduced into a roasting zone, schematically generally indicated as 27. The roasting zone 27 may be further provided with air through line 28, and a recycle spent carbonating gas through line 29, and obtained, as hereinafter described.

The roasting zone 27 is operated at conditions to provide for conversion of sulfide in the flux to sulfate, with the carbonaceous reductant functioning as a fuel for the roasting operation. The roasting zone 27 may be comprised of equipment, of a type known in the art, and which is suitable for effecting roasting of calcium sulfide. As hereinabove described, heat generated during the roasting may be used for producing steam to thereby provide utility requirements. In general, the roasting is accomplished at a temperature of from 1400° F. to 1700° F., preferably 1500° F. to 1600° F.

An off-gas is withdrawn from roasting zone 27 through line 31 for treatment as hereinafter described.

A solid mixture, which includes calcium sulfate, calcium oxide, as well as some calcium sulfide is withdrawn from roasting zone 27 through line 32 for introduction into a carbonation zone, schematically generally indicated as 33.

The carbonation zone 33 is also provided with carbon dioxide containing gas through line 34, and recycle aqueous liquor through line 35. The carbonation zone is operated as hereinabove described in order to carbonate the calcium oxide and any magnesium oxide, as well as any remaining calcium sulfide in the solid mixture by direct contact of the aqueous slurry with carbon dioxide. In general, the carbonation zone is comprised of a suitable gas-liquid contacting device.

As hereinabove described, the carbonation results in conversion of calcium oxide and any magnesium oxide to the carbonate. In addition, calcium sulfide present in the solids is converted to the carbonate, with such conversion generating gaseous hydrogen sulfide.

Spent carbonating gas, which includes hydrogen sulfide, is withdrawn from carbonation zone 33 through line 29 for introduction into the roasting zone 27. As hereinabove described, hydrogen sulfide present in such gas is converted in roasting zone 27 to sulfur dioxide, with such sulfur dioxide subsequently reacting with calcium oxide present in the solids in the roasting zone 27 to convert sulfur dioxide to calcium sulfate.

An aqueous slurry of carbonated solids, which includes calcium carbonate, as well as calcium sulfate is withdrawn from carbonation zone 33 through line 41 for treatment of off-gas from the direct reduction in a scrubbing zone, schematically generally indicated as 42.

Off-gas from the direct reduction zone 14 in line 16, which contains some sulfur oxide, is cooled in heat exchanger 43 by indirect heat exchange with vent gas, and the cooled gas in line 44 is introduced into the scrubbing zone 42 wherein the gas is contacted with the aqueous slurry introduced through line 41. As a result of such contact, in the presence of oxygen, sulfur oxide(s) in the gas is converted to calcium sulfate, with a waste slurry including calcium sulfate being withdrawn from zone 42 through line 45.

The slurry in line 45 is introduced into a recovery zone, schematically generally indicated as 46 in order to separate aqueous liquor from the solid waste, with the separated aqueous liquor in line 35 being employed in carbonation zone 33. Solid waste withdrawn from separation zone 46 through line 47 may be disposed of as a stabilized solid waste.

Scrubbed gas withdrawn from scrubbing zone 42 through line 51, includes carbon dioxide, and a portion of the gas in line 51 is introduced into the carbonation zone 33 through line 34 to provide carbon dioxide requirements therefor.

The remainder of the gas in line 52 is passed through heat exchanger 43 before being released to the atmosphere.

Thus, in accordance with the illustrated embodiment, the solids from the roasting operation are stabilized, and a portion of such stabilized solids is used for scrubbing off-gas from the direct reduction.

Although the invention has been described with respect to a preferred embodiment thereof, numerous modifications and variations of such embodiment are possible within the scope of the invention.

Thus, for example, all or a portion of the off-gas in line 16, which includes carbon dioxide, may be employed for providing carbon dioxide requirements for the carbonation zone 33.

In some cases, it may not be necessary to scrub the off-gas from the direct reduction, and in such cases, the solids from the carbonation zone, after removal of recycle liquor, may be directed to a suitable solid waste disposal.

Similarly, the spent carbonating gas from carbonation zone 33 may be employed in a sulfur recovery zone to recover elemental sulfur from hydrogen sulfide present therein.

The above modifications and others should be apparent to those skilled in the art.

The invention will be further described with respect to the following example; however, the scope of the invention is not to be limited thereby:

EXAMPLE

A solid waste from a direct reduction process after roasting in a fluid bed, which has a calcium sulfide content of 0.83 wt. percent is carbonated, as an aqueous slurry, with gaseous carbon dioxide at 24° C. to 39° C. After treatment, the calcium sulfide content is 0.36 wt. percent. The following tabulates time, and pH of the aqueous slurry:

| Elapsed Time Min. | $CO_2$ Sparge | pH |
| --- | --- | --- |
| 0 | No | — |
| 1 | No | 12.5 |
| 5 | No | 12.55 |
| 15 | No - Start $CO_2$ | 12.46 |
| 17½ | Yes | 12.38 |
| 27 | Yes | 12.22 |
| 37 | Yes | 11.50 |
| 40 | Yes | 10.23 |
| 42 | Yes | 9.10 |
| 50 | Yes | 8.81 |
| 61 | Yes | 7.73 |
| 74 | Yes - Stop $CO_2$ | 7.12 |
| 78 | No | 7.23 |
| 85 | No | 7.60 |
| 94 | No | 7.95 |

The present invention is particularly advantageous in that by treatment of solids as hereinabove described it is possible to provide a stabilized solid waste suitable for disposal. The leachate from such waste has a pH in the order of from 7.5 to 10.5 (specifically 8,9 or 10 depending on the extent of the operation) whereby the solids can be disposed of in less costly dump sites, and perhaps, where available, the solids or concentrated slurry may be disposed of in the ocean. In addition, by proceeding in accordance with the invention it is possible to scrub the off-gas from the reduction with treated solids.

Numerous modifications and variations of the present invention are possible in light of the above teachings and, therefore, within the scope of the appended claims, the invention may be practiced otherwise than as particularly described.

What is claimed is:

1. In a process for reducing iron ore to iron in the presence of a carbonaceous reductant and flux wherein a solid mixture of carbonaceous reductant and spent flux containing calcium oxide and calcium sulfide is recovered from the reducing and subjected to roasting to reduce the sulfide content thereof, the improvement comprising:

carbonating as an aqueous slurry solids recovered from said roasting to further reduce the sulfide content and convert oxide to carbonate and thereby stabilize said solids.

2. The process of claim 1 wherein the solids are carbonated by directly contacting a gas containing carbon dioxide and the aqueous slurry of the solids.

3. The process of claim 2 and further comprising: recovering a gas containing hydrogen sulfide from the carbonating and employing recovered gas in the roasting to remove hydrogen sulfide therefrom.

4. The process of claim 3 wherein the gas containing carbon dioxide is derived from an off-gas from the reducing.

5. The process of claim 2 wherein during at least a portion of the carbonation the pH of the aqueous slurry is below 10.

6. The process of claim 1 wherein the carbonating is effected with an aqueous solution of at least one of alkali carbonate and bicarbonate.

7. The process of claim 1 wherein off-gas containing sulfur oxide is recovered from the reducing, and further comprising:

employing an aqueous slurry of carbonated solids recovered from the roasting for scrubbing off-gas from the reducing to remove sulfur oxides.

8. The process of claim 7 wherein the solids are carbonated by directly contacting a gas containing carbon dioxide and the aqueous slurry of the solids.

9. The process of claim 8 and further comprising: recovering a gas containing hydrogen sulfide from the carbonating and employing recovered gas in the roasting to remove hydrogen sulfide therefrom.

10. The process of claim 9 and further comprising: withdrawing a gas from the roasting and scrubbing withdrawn gas in combination with off-gas from the reducing.

11. The process of claim 10 wherein during at least a portion of the carbonation the pH of the aqueous slurry is below 10.

12. The process of claim 11 wherein the gas containing carbon dioxide is derived from scrubbed gas.

* * * * *